United States Patent
McKay et al.

(10) Patent No.: US 12,220,819 B2
(45) Date of Patent: Feb. 11, 2025

(54) 3-D PRINTED METROLOGY FEATURE GEOMETRY AND DETECTION

(71) Applicant: Divergent Technologies, Inc., Los Angeles, CA (US)

(72) Inventors: Keith McKay, Los Angeles, CA (US); Richard Kingston, Los Angeles, CA (US); Lukas Czinger, Los Angeles, CA (US); Jakub Preis, Los Angeles, CA (US); Sam Miller, Los Angeles, CA (US); Aron Derecichei, Los Angeles, CA (US); Eric Monteith, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 663 days.

(21) Appl. No.: 17/505,596

(22) Filed: Oct. 19, 2021

(65) Prior Publication Data
US 2022/0118617 A1 Apr. 21, 2022
US 2023/0182294 A2 Jun. 15, 2023

Related U.S. Application Data

(60) Provisional application No. 63/094,848, filed on Oct. 21, 2020.

(51) Int. Cl.
*B25J 9/16* (2006.01)
*B25J 13/08* (2006.01)
*G01B 11/00* (2006.01)

(52) U.S. Cl.
CPC ............. *B25J 9/1664* (2013.01); *B25J 13/08* (2013.01); *G01B 11/002* (2013.01)

(58) Field of Classification Search
CPC ........ B25J 9/1664; B25J 13/08; G01B 11/002
See application file for complete search history.

(56) References Cited

U.S. PATENT DOCUMENTS

| 5,203,226 A | 4/1993 | Hongou et al. |
| 5,742,385 A | 4/1998 | Champa |
| (Continued) | | |

FOREIGN PATENT DOCUMENTS

| EP | 3708944 A1 | 9/2020 |
| NO | 2010142703 A2 | 12/2010 |
| (Continued) | | |

OTHER PUBLICATIONS

US 9,202,136 B2, 12/2015, Schmidt et al. (withdrawn)
(Continued)

*Primary Examiner* — Octavia Hollington
(74) *Attorney, Agent, or Firm* — ARENTFOX SCHIFF LLP

(57) ABSTRACT

Aspects for implementing 3-D printed metrology feature geometries and detection are disclosed. The apparatus may a measurement device for a 3-D printed component. The component may include a plurality of printed-in metrology features arranged at different feature locations on a surface of the component. The measurement device can be configured to detect the feature locations of the printed-in metrology features and to determine a position or an orientation of the component based on the detected feature locations. In various embodiments, the metrology feature may be a protruding or recessed spherical portion, with the corresponding feature location at the center of the sphere.

32 Claims, 10 Drawing Sheets

(56) References Cited

U.S. PATENT DOCUMENTS

| | | | |
|---|---|---|---|
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,889,113 B2 * | 5/2005 | Tasker | H01J 37/3023 700/182 |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,095,231 B2 * | 1/2012 | Tasker | H01J 37/3056 700/121 |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |
| 9,823,143 B2 | 11/2017 | Twelves, Jr. et al. | |
| 9,829,564 B2 | 11/2017 | Bruder et al. | |
| 9,846,933 B2 | 12/2017 | Yuksel | |
| 9,854,828 B2 | 1/2018 | Langeland | |

(56) References Cited

U.S. PATENT DOCUMENTS

| | | |
|---|---|---|
| 9,855,698 B2 * | 1/2018 | Perez .................. B29C 48/266 |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |

(56) References Cited

U.S. PATENT DOCUMENTS

| | | | |
|---|---|---|---|
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 * | 10/2019 | Holzer .................. G06F 3/0485 |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,718,604 B2 * | 7/2020 | Bhattacharyya ........ G01B 11/14 |
| 10,776,949 B2 * | 9/2020 | Haven ..................... G06T 7/74 |
| 2005/0248740 A1 * | 11/2005 | Veen .................... G03F 9/7076 355/53 |
| 2006/0108783 A1 | 5/2006 | Ni et al. |
| 2014/0277669 A1 | 9/2014 | Nardi et al. |
| 2015/0213606 A1 * | 7/2015 | Akopyan ............... G06T 7/0004 348/46 |
| 2016/0016363 A1 | 1/2016 | Smith et al. |
| 2017/0113344 A1 | 4/2017 | Schönberg |
| 2017/0176870 A1 * | 6/2017 | Hinnen .............. G03F 7/70525 |
| 2017/0341309 A1 | 11/2017 | Piepenbrock et al. |
| 2017/0368759 A1 * | 12/2017 | Penny ..................... B22F 3/24 |
| 2019/0030605 A1 * | 1/2019 | TenHouten ............. B22F 3/002 |
| 2019/0137893 A1 * | 5/2019 | Den Boef .......... G03F 7/70633 |
| 2019/0235391 A1 * | 8/2019 | Bijnen ................ G03F 7/70683 |
| 2019/0354915 A1 * | 11/2019 | Hockett ................... G06F 30/00 |
| 2019/0381581 A1 | 12/2019 | Kashikar |
| 2020/0232785 A1 * | 7/2020 | Mosher .................. G06V 10/70 |

FOREIGN PATENT DOCUMENTS

| | | |
|---|---|---|
| NO | 2011032533 A1 | 3/2011 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | WO-2018182751 A1 * | 10/2018 ........... B29C 64/393 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Partial European Search Report received for Patent Application No. 21883825.8, mailed on Aug. 5, 2024, 17 pages.

* cited by examiner

3-D PRINTED METROLOGY FEATURE GEOMETRY AND DETECTION

CROSS-REFERENCE TO RELATED APPLICATION

This application claims the benefit of, and right of priority to, U.S. Provisional Patent Application No. 63/094,848 filed Oct. 21, 2020 and entitled "3D Printed Metrology Feature Geometry And Detection", the contents of which are incorporated by reference as if fully set forth herein.

BACKGROUND

Technical Field

The present disclosure generally relates to manufacturing, and more particularly, to product assembly using 3-D printed metrology features.

Introduction

Traditionally, an assembly-line or a manually-intensive approach has been used by manufacturers when joining together constituent parts of a device to be assembled, such as an aircraft or an automobile. The automated assembly of parts, however, is becoming more popular as the sophistication of robotics and processing devices continue to increase.

A significant prerequisite to the success of automated assembly includes the ability to measure parts and to make appropriate adjustments in the parts' positions. In an automated environment involving the potential use of multiple robots, accessing the parts to perform these measurements in a coordinated manner becomes challenging. The complexity of the problem may be more apparent where the parts incorporate intricate shapes or where high precision measurements are required.

In addition, automating the assembly process can require using the robots at the location of the parts to be assembled. Coordinating measurement and assembly in the resulting confined area gives rise to the need to avoid interfering between tasks performed by different machines. Limitations of conventional measurement devices and the need to use more equipment in less space impose constraints on the achievable efficiency and accuracy of assembly processes. The limited physical space in an already cluttered assembly environment can further restrict access to the parts, giving rise to overall manufacturing inflexibilities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Precision in metrology for assembled parts can be an important prerequisite for the successful build of a vehicle, aircraft, ship or other transport structure. For this reason, marks or other features may be placed on components to enable a measurement system to achieve precise values for determining, for example, whether the component is accurately oriented and positioned for joining with another part (the words "part" and "component" may be used interchangeably in this disclosure, and generally refer to a structure to be joined with another structure). One limitation to this procedure involves the nature of the manufacturing process itself. Where components are manufactured using machining and casting, for instance, the allowable sophistication of metrology features that can be built into the component may be limited. In some cases, producing metrology features using traditional subtractive manufacturing can become prohibitively expensive or time-consuming. In other cases, the metrology features may be physically incorporated with the parts through a separate assembly process which further increases the costs and complexity of the overall assembly process.

During assembly, properly coordinating tasks (including measurement and alignment of components to be assembled) with other tasks in time and space can be equally challenging. Accurate measurement techniques can become more difficult in an automated manufacturing facility where assembly is partially or fully automated. The facility may use stations and robotic or automated apparatuses of whatever nature (generally "robots"). The existing available equipment used to align different components for joining with other parts or for making precise measurements is often insufficient. For example, existing measurement devices or robots may require contacting a part at one or multiple points during assembly to retrieve measurement values. This contact may interfere with other necessary tasks, including stabilization and positioning of the parts. The localized nature of the assembly cell can place further constraints on the use of the equipment, limiting its capabilities. The potentially crowded nature of an assembly cell along with the inherent limits in metrology features that can adequately be used as points of reference on a component are just a few of the problems addressed by one or more features of the present disclosure.

In response to the above-identified challenges, aspects of the present disclosure are introduced to enable a partially or fully fixtureless assembly process for a vehicle, aircraft, spacecraft, or other structure. In various embodiments, a contact-free metrology apparatus can be used to substantially reduce the above-described complexities in the assembly process. Contactless metrology may be achieved, in part or in whole, through the use of unique metrology features printed-in with a 3-D printed component. For example, these metrology features may allow a distant measurement device to use a laser detector or other light source to collect metrology data using the printed-in features. In various aspects, the measurement device can combine plane detection (e.g., a plane of a component being measured) and the metrology feature detection (e.g., the spherical portions) to remove the background data and run algorithms that identify metrology feature locations within the component.

In an aspect of the disclosure, a 3-D printed component is disclosed. The component includes a plurality of metrology features arranged at different feature locations on a surface of the component. The metrology features are configured to enable a measurement apparatus to detect the feature locations and to determine at least a component position or a component orientation based on the detected feature locations. Each of the metrology features is printed-in with the component.

In another aspect of the disclosure, an apparatus includes a measurement device for a 3-D printed component. The component includes a plurality of printed-in metrology features arranged at different feature locations on a surface of the component. The measurement device is configured to detect the feature locations of the printed-in metrology features and to determine at least a component position or a component orientation on the detected feature locations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In one aspect of the disclosure, a geometry may be 3-D printed within the surface of a 3-D printed component. The geometry may facilitate the detection by a measurement device of a coordinate frame on the component. The geometry, referred to herein as a metrology feature, may be 3-D printed-in with the component. In various embodiments, a plurality of metrology features may be 3-D printed-in with a component. For example, in some arrangements, three metrology features may be embedded in a surface of the component. In various exemplary embodiments, a plurality of such metrology features may be used to enable a measurement device to measure the position and orientation of the component during an automated assembly process.

Another part, intended for joining with the component, may include a similar arrangement of metrology features. The measurement device may use the measured position and orientation of the component and the adjacent part to adjust the robots holding the component and the part to a target position, in order to precisely join the component and the part in accordance with their respective geometries.

The assembly process may include one or more robots. The measurement device may be a robot, in part or in whole. The measurement device may include a controller and a detector operatively coupled to the controller. The detector may be part of the measurement device. The detector may, for example, include an energy beam source, such as a laser, for example. In various embodiments, the energy beam may be infrared, visible, or ultraviolet light, for example.

Figure 1:
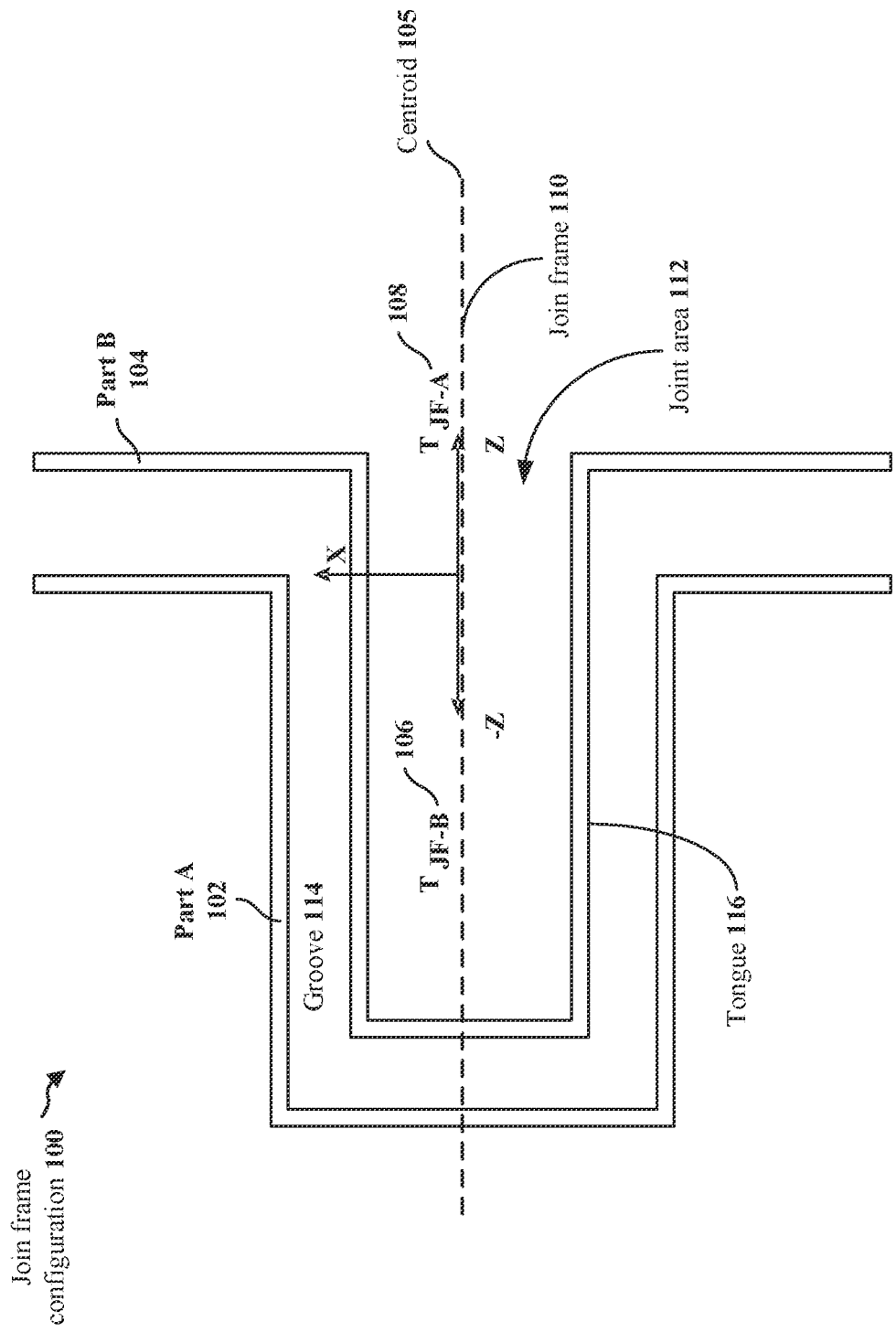
FIG. 1 is a conceptual illustration of two parts joined via a non-contact procedure using a join frame.

FIG. 1 is a conceptual illustration of a two parts A (102) and B (104) to be joined via a contact-free measurement system (e.g., a measurement device using a laser) from a distance using a join frame configuration 100. A "contact-free" measurement is one where the measurement device(s) does not make physical contact with the devices to make the relevant measurements. This contact-free feature advantageously reduces the chance of an accidental dislodging or movement of a component from its known position. In addition, the contact-free feature allows additional or different tasks to be performed, concurrently or in rapid sequence with the measurements. The contact-free nature of the measurement device and 3-D component disclosed herein can reduce the complexity and clutter in an assembly cell or station. This enables multiple tasks to be performed at a great pace compared with conventional measurement devices.

Measuring the position and orientation of a component to be joined with another part during an assembly process can be performed using different techniques. In the exemplary embodiment of FIG. 1, these measurement procedures can be accomplished by measuring the position and orientation of a join frame 110 of the parts 102, 104. A join frame may be a coordinate-based reference frame located at a centroid 105 of a joint area 112, where the join frame 110 is measured with respect to a common coordinate axis (here, the Z-axis) oriented along the join frame 110 and the vector of intended insertion for the part (along the −Z or negative Z axis arrow). Other types of coordinate frames are also feasible and can be defined or reproduced based on the metrology features of one or more parts. These include, for example and without limitation, standard Cartesian coordinate frames, frames using cylindrical or spherical coordinates, and the like.

In this assembly example, Part A 102 may have a groove 114 aligned mid-way with join frame 110. Part B 104 may have a tongue 116 for joining with Part A 102. Thus, using the join frame, the tongue 116 of Part B 104 may be aligned with the groove 114 of Part A 102 using the join frame 110. The insertion of Part B 104 may be along the vector of insertion Z of the join frame 110, as defined by the left horizontal arrow designated Z.

In a nominal position of two exemplary adjacent components in an assembly connected by a joint, such as the configuration of FIG. 1, the join frames of the parts obey the following equation:

$$T_{JF-A-N} = T_{JF-B-N} * \begin{vmatrix} 1 & 0 & 0 & 0 \\ 0 & -1 & 0 & 0 \\ 0 & 0 & -1 & 0 \\ 0 & 0 & 0 & 1 \end{vmatrix}$$

In this equation, $T_{JF-A-N}$ represents the 4×4 homogenous transformation matrix of the nominal join frame of Part A (102) with respect to a common reference frame (shown as the X-Z coordinate axes in FIG. 1). Similarly, $T_{JF-B-N}$ represents the nominal join frame of Part B (104) with respect to the same common reference frame. The designation $T_{JF-B}$ 106 in FIG. 1 represent matrix elements identifying the position and orientation of Part B 102 for use in the above equation for determining the nominal data for $T_{JF-A}$ 108 with respect to Part A 102. These data in turn may be used for precise alignment and insertion of the tongue 116 of Part B 104 into the groove 114 of Part A 102.

In still another aspect of the disclosure, an assembly cell includes a measurement device. The assembly cell obtains a 3-D printed component. The component is being joined with another part. The component includes a plurality of printed-in metrology features arranged at different feature locations on a surface of the component. The measurement device is configured to detect the feature locations of the printed-in metrology features and to determine at least a position or an orientation of the component based on the detected feature locations. The assembly cell further includes a robot. The robot is configured to engage the 3-D component for joining with the part using the determined position or the orientation.

The parts described in FIG. 1 may be one or more 3-D printed components that include metrology features as described herein. In various aspects as noted, metrology features are printed-in with the 3-D printed component. The metrology features can be arranged at different feature locations on a surface of the component. The metrology features may be configured to enable a measurement device to detect the feature locations and to determine position or orientation of the component based on the detected feature locations.

The metrology features according to various embodiments may use numerous geographical shapes to ensure precise measurements. These features may advantageously enable contact-free measurements so that other robots at the assembly station or cell can concurrently perform tasks or sequentially perform tasks selectively and rapidly. These concurrent tasks may include, for one, gripping the component(s) to be assembled while the measurements are being recorded. The gripping operation may be performed using one or more engagement features. The engagement features may be 3-D printed or otherwise built into the component. The engagement features may be constructed to enable a robotic arm or other device to grip and hold the component via a suitable end effector. Similar robots and equipment may perform related tasks, using the engagement features or otherwise, for aligning, stabilizing, tooling, fixturing (optionally), and performing a host of assembly-related operations. The operations as noted can be performed concurrently or in sets of efficient sequences, with less risk of task interference or accidental robot collisions, in part because the measurements using the metrology features herein may be partially or completely contact-free. The complexity of the assembly station can be reduced.

In another aspect of the disclosure, a partial sphere geometrical configuration may be used for implementing metrology features. In big or small components that have simple or very complex features, partial sphere metrology may be implemented to allow a visual or laser based contact-free measurement system to quickly and efficiently scan and recognize the sphere-like metrology features as unique from other features. The measurement device may identify the feature locations of the metrology features based on data collection points and use one or more algorithms to find the feature locations. The measurement device can use the feature locations to measure locations, positions, shapes, sizes, and orientations of the component the metrology features are located on. For example, in various embodiments, the measurement device may generate a reference frame relative to which other positions on the component can be measured. In various embodiments, the measurement device can use the feature locations in the identified metrology features to triangulate locations, and therefore measure positions and orientations of the component. In various embodiments, the generated measurement data can be efficiently provided to a controller to compare the generated measurement data with nominal measurement data describing nominal positions. The data can be provided to other robots or equipment to reposition or realign the component as necessary to enable the parts to be joined precisely. The accuracy of the assembled parts and the overall quality of the assembly process can be increased as a result.

In some embodiments where the metrology data indicates that the component needs to be modified, the 3-D printed component may be re-printed or augmented with additional 3-D printing. In some embodiments, the component can be repaired in a post-processing operation using fixtures, welding, adhesives, machining, or another technique. The repaired component can then be returned to the assembly station for joining with other parts.

For the purposes of this disclosure, the terms assembly station, assembly cell, and related nomenclature used are generally intended to describe the location of an assembly process or portion thereof, such as where metrology data is measured and components are joined together. However, the terms assembly station, assembly cell, and similar terms should not be limited to require that assembly-based operations must occur in a single location. In various embodiments, the metrology-based data may be retrieved in one location along with some assembly activity, for example, and other or different assembly techniques may occur at another location. In short, the principles of the disclosure do not require any particular location for one or more of the features described herein to be located.

Figure 2:
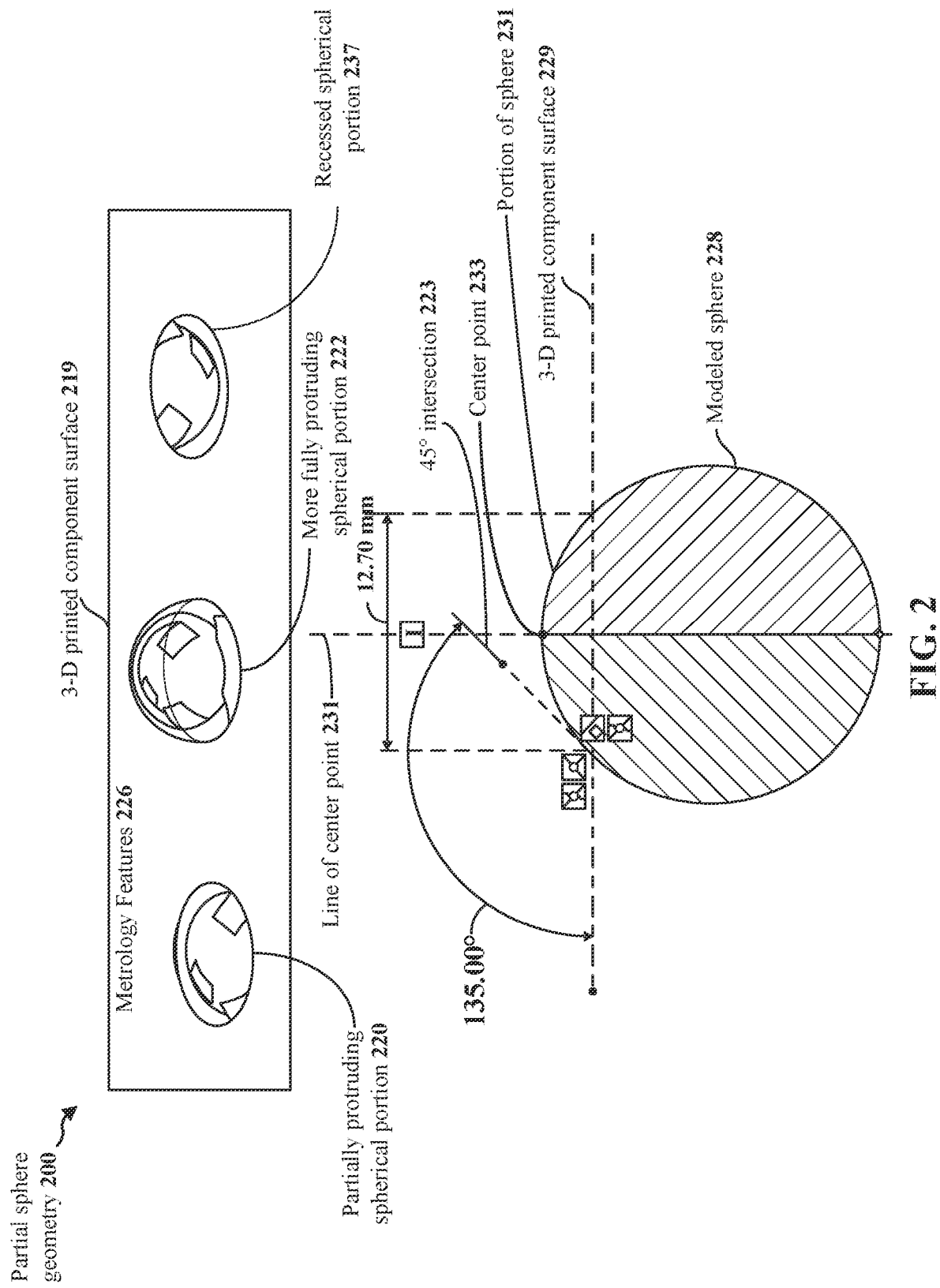
FIG. 2 is a diagram illustrating perspective examples of different metrology features that are formed using protruding or recessed portions of a sphere.

FIG. 2 is a diagram illustrating perspective examples of different metrology features that are formed using protruding or recessed portions of a sphere. FIG. 2 shows examples of partial sphere geometry 200 for use in metrology features. Example component surface 219 may be a surface of a 3-D printed component. The surface 219 shows example metrology features 226. These three examples are in the shape of a portion of a sphere. In some embodiments, the size of the hypothetical full sphere (e.g., its diameter) used for modeling the metrology feature is the same for all three illustrated metrology features 226. As shown, the spherical portion 220 may partially protrude from the component surface 219. The spherical portion 222 may be protruding to a greater extent, but still may constitute a portion of a sphere. In contrast to spherical portions 220 and 222, the third metrology feature 226 shown is a recessed spherical portion 237.

In various embodiments, one or more of these alternatives may be 3-D printed-in with a surface of the 3-D printed component. Whether to use a protruding spherical portion or a recessed one may depend in part on the internal structure of the component near the metrology feature. The internal structure under the surface 219 directly underneath the metrology features 226 may be unrelated to metrology functions and may instead be a different structure altogether. In other examples, the region near the metrology feature 226 may be uniformly solid, porous, hollow, etc. The recessed spherical portion may be used in portions of a component surface adjacent an internal structure that allows a recessed metrology feature, without degrading component performance. An example of such a component surface may include regions of the surface that are hollow underneath, or that are solid underneath and in which the recess can be placed without undermining the component's structural features (if any) at that region.

Where a portion of a protruding sphere is used, the remainder of the sphere need not be underneath the surface. Instead, the spherical properties may be included in a design model using a computer aided design (CAD) program or similar software. The spherical portions may be based on a sphere with a particular diameter, but only the protruding portion of the sphere is actually 3-D printed. In various embodiments, three metrology features may be 3-D printed in with a component surface. The three metrology features may be configured to enable the measurement device to triangulate the feature locations to ultimately identify the position and location of a component.

However, a different number of metrology features may be used. Associated with each metrology feature is a feature location, or a designated point used by the measurement device to identify the exact measurement for that metrology structure. A partial sphere geometry is one of many possible examples of a metrology feature. In various embodiments of the partial sphere geometry, the feature location may fall on the center point of the protruding or recessed spherical portion 220, 222, 237, 231, etc.

In various embodiments, the partial sphere geometry making up the example portion 231 of the sphere may be modeled from a sphere having a fixed diameter. One such modelled sphere 228 is shown in FIG. 2. For example, one geometry may use a partial sphere based on a sphere diameter of 17.96 mm. The number can be any maximum size or minimum size, down to the resolution of the 3-D printer. In the numerical example described, the surface of the sphere may be configured to make a 45° angle (223) with the component surface 229 at the point of intersection, which in this example results in a 12.7 mm diameter circular footprint on the component surface 229, as shown by the horizontal arrow above the spherical portion 231. The 45° intersection is also evident from the 135° angle between a region of the component surface 229 to the left of the portion 231 of the sphere and the line 223.

The 45° angle beneficially can be used in an embodiment to strike a suitable balance between competing objectives of minimizing the sensitivity of the detected spherical portion's position on one hand, and maximizing the signal-to-noise ratio of the metrology data collected on the spherical portion on the other hand. However, this angle may be altered in other metrology features in order to place greater emphasis on one objective over another, if the application so merits.

In various embodiments, a laser measurement device is used to detect the metrology features and the feature locations. As an example of the competing objectives, the laser light (or other light source) may produce light-scattering phenomena when the laser scans the component surface 229 for the spherical portion 231. An increasing amount of noise can be present on the spherical portion 231 when the angle of incidence of the laser relative to the surface is greater than 45°. The surface 229 immediately surrounding the sphere can be relatively flat in various embodiments, which can affect the amount of scattering.

Other criteria may affect not only the angle of the spherical protrusion, but also which type of partial sphere geometry should be used. In example processes involving the design of a component, the outside surface of the component (such as component surface 229) may be said to be locked if the design or configuration on the outside surface of the component is complete, and further designs or optimizations are only made inward, i.e., internal to the component. If the outer design is locked and subsequent optimizations are performed inward, the protruding variant (versus the recessed) of the available partial sphere geometries 200 may be more desirable for generating the remaining metrology features. Protruding outward, this variant may interfere less with internal geometries created under the component surface during the design phase and hence may be more desirable over the recessed variant. The latter variant, being recessed inward toward potentially complex internal part geometries, may be less desirable. By contrast, where the material is not used or needed (e.g., solid or empty), a recessed spherical portion can be considered because of potentially less noise due to light scattering and because it does not interfere with the nonexistent designs on the inside of the component.

One example is in the context of a 3-D printed node used as an A-surface (a specific type of panel) in a vehicle. Certain regulations or specifications identify specific outer clearances that automobile manufacturers may adhere to in designing the A-surface. In this location, using the recessed variant of the partial sphere geometry may be more desirable to avoid protrusions on the part that may be incompatible with such requirements.

In partial sphere geometries as disclosed herein, the feature location may be the ultimate output of the detection process when the metrology features is identified. As noted, the feature location may be the center point 233 of the sphere, as seen in FIG. 2 by an observer at the line 231 of the center point, located directly vertically above the spherical portion 231. In embodiments using three sphere portions printed-in with a 3-D component, the position and orientation of a coordinate frame can be computed based on the measured feature locations, i.e., the center points including center point 233 in this example. Different methods may be used to make this computation. In various embodiments, a least-squares minimization is used between the detected center points and the nominal center points. The determination may be made by the measurement device. In some embodiments, the computations are made by one or more controllers based on the data received by the measurement device, regardless of whether the one or more controllers reside in the measurement device itself. For example, a high-speed server may be used, or any other device capable of performing the computations. The data may be passed over a wired or wireless channel or network from the measurement device to the server or other computing device, if necessary.

Various considerations may dictate the optimal position, size, orientation, number, detection, noise effects, and other relevant characteristics of metrology features in a component. In various embodiments, the positioning may be subject to a number of constraints. For example, numerous geometrical combinations can result in a fully constrained six degree-of-freedom alignment, with a wide range of accuracy and repeatability. In these examples, an important driver of performance is the ratio (i) of the volume encompassed by the geometry being used to constrain the alignment to (ii) the volume encompassed by the object to be controlled. For instance, to determine the position of a part in space, it is generally more accurate to measure a geometry that is spread out over the volume of the part rather than the geometry being bunched up in one small area. An example of using this strategy to the designer's advantage is described below with reference to FIG. 4.

Other constraints may be present, and other considerations important. Some non-exhaustive examples may include accuracy, repeatability, speed, sensitivity, field-of-view range, and mass. In various embodiments, one or more of these factors may be considered, and some may also act as constraints, in selecting a geometry over which to be measured. Another consideration is which of many embodiments are available for a designer to identify or generate a reference frame based on detected metrology features, as described in this disclosure.

In some embodiments, a designer may add a margin for error when designing metrology features for a 3-D printed component. For example, the exact location of the feature at issue is probably not known during the assembly process. Thus, a large number of data points on the spherical portion and the surrounding surface of the component may be measured with the measurement device based on the expected location and error. In various embodiments, as a result of the constraints inherent in a measurement device's finite field of view, the designer may select a range of angles of incidence from a source on the measurement device (e.g., a laser source) to a region of the surface including the metrology features.

Figure 3:
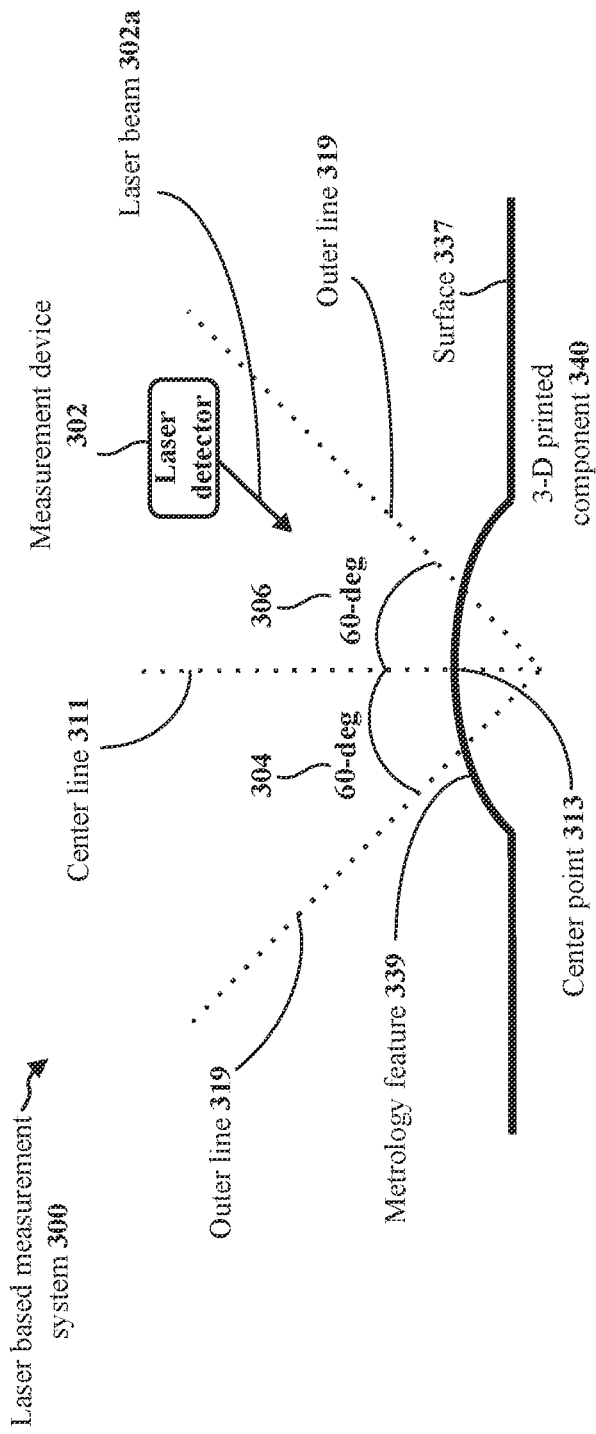
FIG. 3 is a diagram illustrating a cross-section of a metrology feature, a feature location of which is configured for measurement by a laser.

FIG. 3 is a diagram illustrating a cross-section of a metrology feature, a feature location of which is configured for measurement by a laser 302 in a laser-based measurement system 300. A 3-D printed component 340 may include a surface 337. The surface shows a protruding variant of a metrology feature 339 having a center point 313 in the center of the metrology feature 339 and a (non-physical) center line 311 aligned vertically with the center point 313 and normal to the surface 337 of the component 340. A measurement device 302 in this example includes a laser detector. The measurement device 302 may further include a controller (including one or more processors or CPUs), memory (including random access memory, read only memory, flash memory, hard drives, etc.), dedicated hardware (such as digital signal processors, application specific integrated circuits (ASICs), field programmable gate arrays (FPGAs), etc.) or other electronic circuits for gathering the collected data points.

As is evident from the illustration, the metrology feature 339 is located on the surface 337 within a range of angles of incidence of the laser 302. In this example, where the center point 313 is in the center of the portion of the sphere, the center line 311 is used as a vertical reference normal to the 3-D printed component 340. It should be noted that the center line 311 in reality would be centered in three dimensions, as would the angles of the laser beam, instead of the two dimensional representation of the figure.

The angles of incidence 304 and 306 are taken from a source of the laser beam 302a to the center point 313, being measurable relative to center line 311, such that the range of angles falls within a tolerance of the measurement device 302. In this example, the tolerance (and hence the range) is assumed to be between plus (+) and minus (−) 60° (degrees) with respect to the center line. Thus, in the embodiment of FIG. 3, the overall field of view of the measurement device 302 is taken into account. In some embodiments, the measurement device is mobile, and the source can be moved to accommodate the field of view defined by outer lines 319. The outer lines 319 in some embodiments form a cone shape in a three-dimensional representation.

More generally, a plurality of metrology features can be used, in which event the plurality should be accessible to the measurement device 302. Accordingly, in various embodiments, a region of the surface 337 including the plurality of metrology features is selected such that the range of angles of incidence (also being measurable relative to a reference frame) falls within a tolerance of the measurement device 302.

In the configuration of FIG. 3, the feature location at the center point 313 can be measured over the described range of angles or field of view from the surrounding surface normal to the 3-D printed component 340. This range may benefit the assembly process and overall system accuracy of various embodiments because a wider range of join positions is possible. This in turn can increase assembly size and flexibility. In some embodiments, this beneficial range allows the designer to prioritize mitigating other factors affecting join accuracy. These factors include, for example, undesirable moments induced by adhesive insertion forces and by gravity.

In various embodiments, the measurement device 302 may proceed to collect data points to obtain the feature location at center point 313. After the points are collected at and adjacent the metrology feature 337 by the measurement device 302, the data points identified to be on the surrounding surface of the component (e.g., the background not including the metrology feature 339) can be removed. In an embodiment, this step may be performed by executing the Random-Sample-Consensus (RANSAC) algorithm for a plane. Thereupon, all data points from the data set within a specified distance from the plane may be removed. The RANSAC algorithm for a sphere can then be executed on the remaining data points until the feature location is detected.

While one exemplary algorithm is described above for detecting a feature location, the present disclosure is not so limited and other suitable algorithms may be used for feature detection. In addition, as described below, different metrology features may use feature locations that are not at the center and/or that are specific to the geometry of the metrology feature used. In general, a best fit between the measured points and the reference points may be used during the assembly. Any number of algorithms may be used to achieve this best fit.

After the feature locations are identified, in some embodiments, a least squares minimization routine may be executed by the measurement device 302 or any suitable computational device coupled to the measurement device as described above. An exemplary summary of the detection process may include the following steps in one embodiment:

First, the measurement device 302 can 3-D-scan an area on the 3-D printed component 340 where the feature location is expected to be located within an expected error.

Second, the measurement device 302 (or related controller/computing device) may execute plane RANSAC to detect the background plane and remove all points within a specified distance from the plane and all points located on the opposite side of the plane to the laser source.

Third, the measurement device 302 (or related controller/computing device) may execute sphere RANSAC to detect the sphere center point from the remaining data points.

Fourth, the first three steps may be repeated for the two additional feature locations.

Fifth, the measurement device 302 (or related controller/computing device) may execute a least-squares minimization between detected sphere center points and nominal sphere center points to compute the detected position and orientation of the coordinate frame and/or the component.

In other embodiments, the measurement device 302 may perform an Iterative Closest Point Algorithm (ICP) to be used in lieu of RANSAC. The detection process in embodiments using ICP may be summarized in the following steps.

First, the measurement device 302 may 3-D-scan an area on the node where the feature is expected to be located within an expected error.

Second, the measurement device 302 (or related controller/computing device) may execute ICP to find the transformation from the nominal position of the sphere to the measured point cloud, resulting in the detected position of the sphere.

Third, the measurement device 302 may repeat the first and second steps for the two additional spherical portions.

Fourth, the measurement device 302 may execute least-squares minimization between the detected sphere center points and nominal sphere center points to compute the detected position and orientation of the coordinate frame and/or the component.

In various embodiments, the metrology features may include different geometries.

For example, in some configurations, a cone may be used in place of a sphere to compute a point at its vertex. In these embodiments, a designer may place three or more cones for 3-D printing on each component. The only difference in the detection algorithm would be in the third step, where RANSAC can be executed for a cone rather than a sphere. Cones may have a more restrictive field-of-view limit due to a higher sensitivity of the vertex as the laser's angle-of-incidence changes.

In various embodiments, pyramids may be implemented as metrology features.

Different pyramids can be 3-D printed-in with the component and utilized as in the examples below.

Single Trihedral Pyramid

A single pyramid with three faces can be used to compute a join frame using the apex as the origin or feature location. The normal vectors to the pyramidal faces may beneficially be used to lock rotation. In various embodiments, the measurement device including the controller, laser or other energy beam may perform the following example detection algorithm or derivation thereof:
   (1) Execute RANSAC for a plane to find the three pyramidal faces and the background plane.
   (2) Remove all points on the background plane within a tolerance and all points located on the opposite side of the plane to the laser detector.
   (3) Remove the points on the pyramid edges by finding the points that are within a tolerance of greater than one plane.
   (4) Execute RANSAC on the remaining points to find the three pyramid faces (face A, B and C).
   (5) Compute the apex point as the intersection of the three face planes. This is the pyramid origin that may be used as the feature location.
   (6) Compute the cross product of the normal vectors to the three face planes to define the Z-axis of the pyramid frame.
   (7) Project the normal vector to face A onto the background plane and use the projected data to define the direction of the X-axis.
   (8) Compute the join frame as a fixed transformation from the pyramid frame.

Three Trihedral Pyramids

In some embodiments, three trihedral pyramid features and their computed apex points can be used as feature locations or center points to compute a join frame. In various embodiments, the measurement device including the controller, laser or other energy beam may perform the following example detection algorithm or variation thereof:
   (1) Execute RANSAC for a plane to find the three faces and the background plane.
   (2) Remove all points on the background plane within a tolerance and all points located on the opposite side of the plane to the laser detector.
   (3) Remove the points on the pyramid edges by finding the points that are within a tolerance of greater than one plane.
   (4) Execute RANSAC on the remaining points to find the three pyramid faces (face A, B and C).
   (5) Compute the apex point (feature location) as the intersection of the three face planes.
   (6) Repeat the above for two additional features
   (7) Execute least-squares minimization between detected pyramid apex points (feature locations) and nominal pyramid apex points to compute the detected position and orientation of the coordinate frame and/or the component.

Three 4-Sided Pyramids

Three 4-sided pyramids with a square base can be used in place of three spheres to compute a join frame. Because the intersection of three planes defines a point, four different intersection points can be computed from the combinations of the four face planes of the pyramid, which can then be used to compute the average apex point of the pyramid. In various embodiments, the measurement device including the controller, laser or other energy beam may perform the following example detection algorithm or variation thereof:
   (1) Execute RANSAC for a plane to find the four faces and the background plane.
   (2) Remove all points on the background plane within a tolerance and all points located on the opposite side of the plane to the laser detector.
   (3) Remove the points on the pyramid edges by finding the points that are within a tolerance of greater than one plane.
   (4) Execute RANSAC on the remaining points to find the four pyramid faces (face A, B, C, and D).
   (5) Compute the intersection points of the following plane combinations: ABC, BCD, CDA, DAB.
   (6) Compute the average of the four intersection points from the prior step.
   (7) Repeat the above steps for two additional pyramids.
   (8) Execute least-squares minimization between detected pyramid apex points (feature locations) and nominal pyramid apex points to compute the detected position and orientation of the coordinate frame and/or the component.

In all of the exemplary embodiments above, criteria including feature size, field-of-view limits, activity of other robots or equipment at or near the same time that may interrupt the procedures, tolerances, and other considerations are relevant considerations in identifying an optimal detection algorithm. Further most or all of these criteria are subject to the constraints and capabilities of the measurement device being used, and the layout and size of the assembly cell. In addition, as noted above, different algorithms may be used to generate different types of coordinates or frames based on the detected feature locations, and are intended to fall within the scope of the present disclosure.

Figure 4:
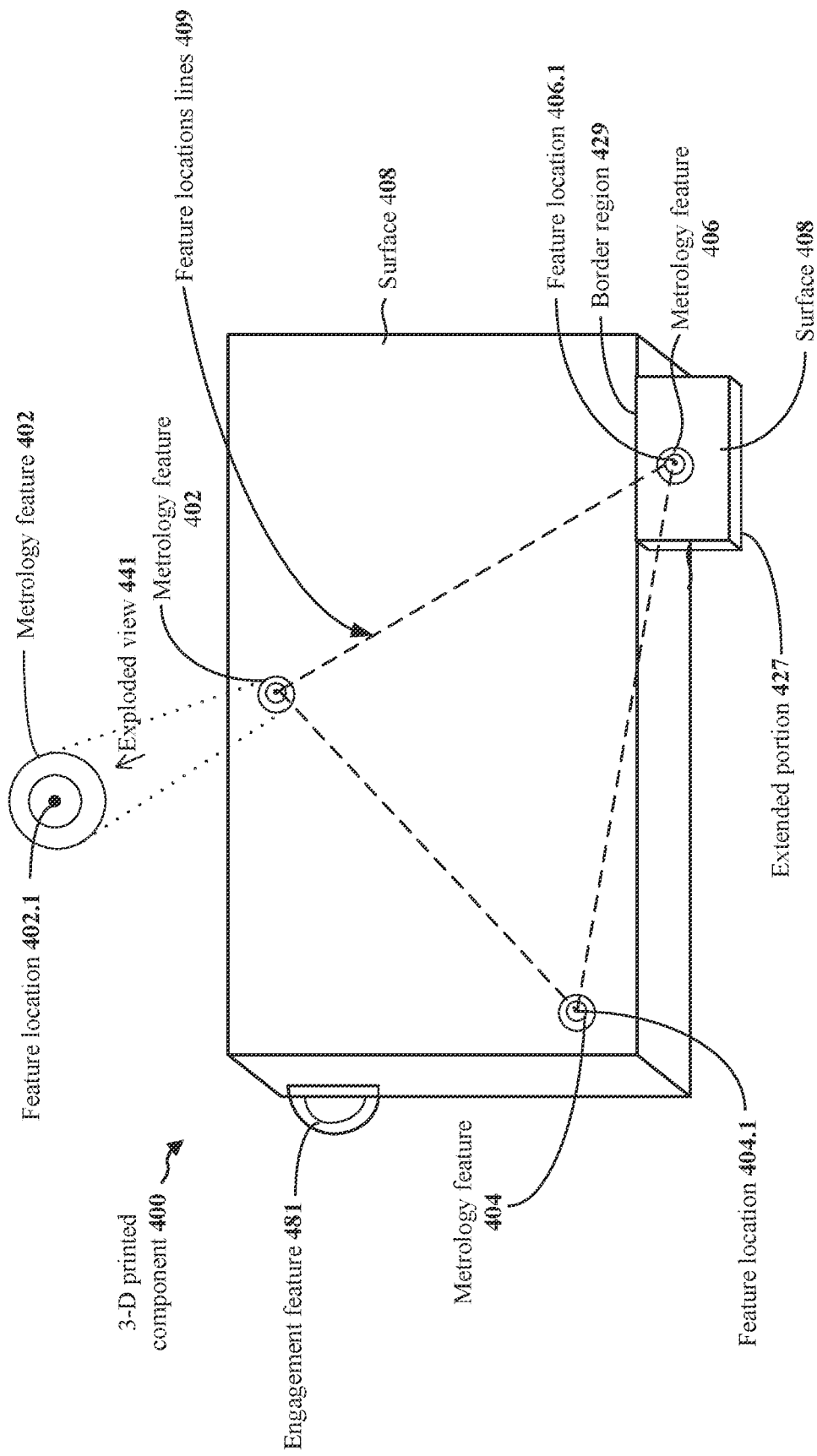
FIG. 4 is an example of a 3-D printed component having metrology features.

FIG. 4 is an example of a 3-D printed component 400 having metrology features 402, 404 and 406. In some embodiments, the 3-D printed component 400 may be a vehicle node. A node as uniquely described herein is a flexible, modular, component that can act as a meeting point for other parts in a vehicle. For example, a plurality of nodes may be created based on specified digital requirements for a transport structure. The plurality of nodes can each incorporate different geometrical shapes, structures and functions to define the internal workings of a vehicle.

Nodes in this example may be diversely 3-D printed to include solid material to provide a basis for a vehicle's frame. For example, a plurality of nodes may be interconnected via rods, tubes, other extended structures, or other nodes to produce the frame. Nodes can include crash structures. They can be solid to support and stabilize the vehicle frame. In some cases, nodes can be hollow to reduce mass.

In some specialized applications, nodes can incorporate different types of electric and mechanical equipment. They can be used to house electronic circuits. They can include channels to route fluids. A node may commonly proceed through the automated assembly process as it is joined with other structures to produce the vehicle, aircraft, etc. A node is one example of different components that may be assembled using the metrology-based techniques herein.

Referring to FIG. 4, 3-D printed component 400 includes a generally planar surface 408. The generally planar surface 408 is intended to convey that the surface 408 need not be, and in most cases is not, perfectly flat. There may be bumps, material overlaps, and other surface features. The surface 408 as a whole may be slightly curved in one or more places, or may have intentional disconnects. In the example shown, the 3-D printed component 400 includes an extended portion 427, which is a generally cubical structure. The surface 408 includes a border region which may manifest as a discontinuity or rough edge, especially if the vertical levels of the larger portion of the component is higher or lower than the extended portion 427.

The surface 408 in FIG. 4 includes three metrology features 402, 404, and 406. While the surface 408 is generally flat in this example, this need not be the case and often the surface will be curved or randomly shaped, or may include multiple sub-surfaces, etc. For example, a cylindrical object can include metrology features on its curved surface. The shape of the component in general is dictated by the identity of the components, and its structure and function.

It was earlier mentioned that in general, the more spread out the metrology features, the larger the geometry defined by the features, which can be more desirable as more a more accurate component position and orientation can be obtained. The embodiment in FIG. 4 takes advantage of this information. That is to say, the metrology features 402, 404 and 406 are not grouped into a small surface region, but rather are spread out across the surface 408 so that their respective feature locations (e.g., 402.1 and 406.1) form a set of triangular feature location lines 409 in which each line is similar in length. The metrology features 402, 404 and 406 form an approximately equilateral triangle, which may increase accuracy of the triangulation of feature location lines 409.

In this embodiment, the metrology features used are portions of a sphere. As is illustrated in the arrow adjacent the exploded view 441, the metrology feature 402 includes a feature location 402.1 at the center of the protruding or recessed portion of the sphere. The other two metrology features 404 and 406 may be protruding or recessed portions of a sphere and include respective feature locations 404.1 and 406.1 at their centers. As discussed at length above, a measurement device may include a laser detector that emits a laser beam. The laser beam may be a tightly focused beam of infrared light, such as in fast pulses (e.g., 1000 times per second). The measurement device—here, the laser detector—receives the reflected pulse and ascertains metrology information based on the energy and possibly deviations in direction of the reflected pulse. The laser detector (also referred to as the "laser" or measurement device 302 of FIG. 3) may be sensitive and may be extremely fast. Other detectors using lasers or different energy beams may function differently while producing similar results, and are intended to fall within the scope of the disclosure.

The 3-D printed component 400 may be printed using any available type of 3-D printer. In various embodiments, the component 400 may be printed (with the metrology features being co-printed) using a powder bed fusion (PBF) based technology, as one example. In a recoating cycle, a PBF-printer may deposit a powder-based print material in a very thin layer. After the layer of powder is deposited, a scanner (such as a laser or electron beam source, or electric arc) fuses or melts the cross-sectional portions of the layer which, according to the information originating from a CAD file, correspond to the component. The region targeted by the energy beam creates a weld pool that liquefies before hardening into a solid portion.

In a PBF-based 3-D printer, a scanning cycle typically follows each recoating cycle. The process continues until all layers are deposited and the selected areas of each layer are fused, rendering the component complete. The residual powder may then be cleaned from the component, and any support structures used to support overhanging regions of the print job may be removed. In other examples, fused deposition modeling (FDM) may be used to 3-D print the part. In short, any of the available 3-D printing techniques may be used. One big advantage of 3D printing the part is that, unlike traditional machining, casting or subtractive manufacturing methods, the 3-D printer may create a component with an arbitrary complexity and a high precision, using distinctive geometries generated from an array of choices of print materials.

In various embodiments, after the necessary measurements are completed and the component is assembled, one of the robots may shave off any available metrology features. In some cases, the metrology features may be inaccessible once the 3-D printed component is joined with another part. For those protruding metrology features that are accessible, cutting them off, melting them, or otherwise removing them and flattening out the surface beneficially can reduce mass of the vehicle or other transport structure.

FIG. 4 also shows engagement feature 481. One or more engagement features may be 3-D printed-in with the component 400. The engagement feature may take on any shape compatible for access by a robot with the necessary end effector or gripper. In various embodiments, the engagement feature 481 is used to enable a robot to grip the component 400. In some embodiments, engagement features are included at opposite ends of an elongated component.

Engagement feature 481 may enable a robot to firmly grip the component 481 using a compatible end effector. One or more robots may use the engagement feature 481 to hold the component 400, to stabilize the component 400 during assembly, and as needed, to realign, reorient, or reposition the component 400, e.g., based on feedback include results of measurement data from the measurement device. Engagement features may include cavities or apertures in the printed component as well.

It may be important during assembly of the component 400 for a robot to physically contact the component 400 (in one or more places) to stabilize or to re-orient or re-position the component based on measurement results, or just due to initial positioning, or for other reasons. For this reason, in various embodiments, each of the metrology features may have a location and a shape that is selected to avoid interfering with a robot that is contacting the component in the manner described above.

That is, one way to help ensure that no interference will occur during the measurement sequences is to position the metrology features to allow sufficient room for more than one robotic apparatus to concurrently access the component for performing one or more functions. In the example of FIG. 4, the shape of component 400 allows for an engagement feature 481 to be placed on a side of the component, while the metrology features 402, 404, 406 are arranged on another surface sufficiently far from the engagement feature to enable robots to stabilize the component during the measurements and to adjust the position of the component when joining it with another part.

To this end, in various embodiments, each of the metrology features may be provided with a minimum set-off distance from an engagement feature on the component. The minimum set-off distance can be selected such that gripping and measurement functions can be concurrently performed. By ensuring a minimum set-off, the assembly sequences can allow measurements to be taken during the stabilization, the reorientation or the repositioning events without having to disengage the robotic apparatus from the component.

In addition, different robots may be programmed to perform other tasks on the component, such as machining features or performing direct energy deposition for modifying the component 400, etc., in fast sequence while the component is being held. Other example processes that the robot(s) can perform during assembly is attaching or removing mechanical fixtures, aligning the component with another part, applying adhesive, using tools, sanding the component, or machining the component. Including these set-off distances helps permit a faster assembly process. Where the component can be gripped continuously through the measurements, the robot using the gripping interface 481 may make fast corrective measures (e.g., realignments) based on the measurement results, in addition to allowing other processes to be performed in an interference free manner. In some cases, the assembly may be fixtureless.

Once the component is joined with the part in the assembly process, a next phase may begin if necessary where the robots apply adhesive, fasteners, welding, etc. as necessary to permanently affix the component and part. Additional parts may be joined until the assembly process is complete.

Figure 5:
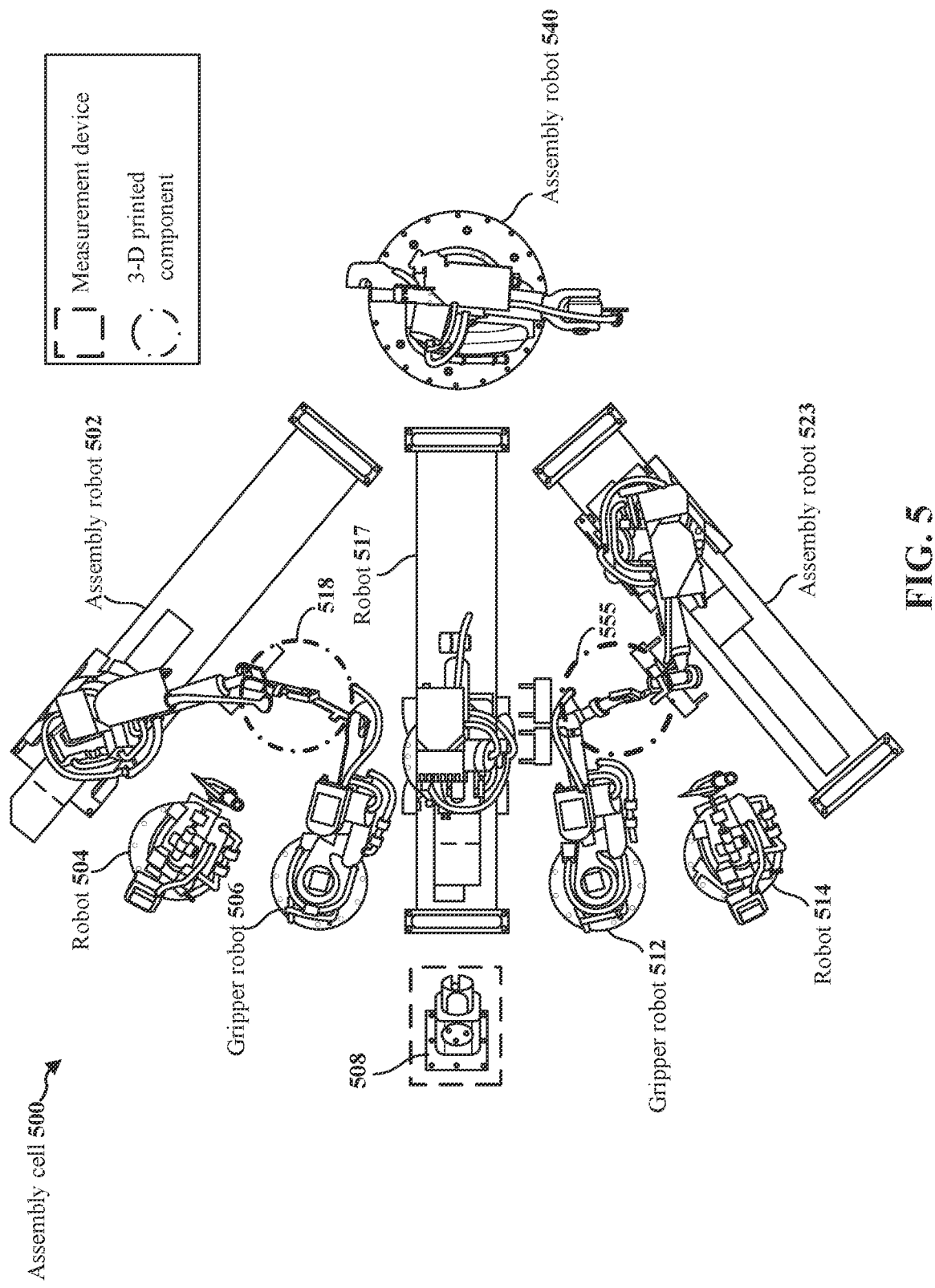
FIG. 5 is a top-down diagram illustrating an example of an assembly cell for joining parts using a measurement device that detects metrology features.

FIG. 5 is a top-down diagram illustrating an example of an assembly cell 500 for joining parts using a measurement device that detects metrology features. The cell 500 uses a number of robots to perform different tasks to ultimately effect the assembly.

As demonstrated in FIG. 5, the area for each robot to access a component or perform another task can be limited. This includes robots that hold the components being joined, whether to stabilize them, reorient them or re-position them or to join them with another part. Thus, in one configuration, interference-free assembly can be achieved in part at the component level. Each of the metrology features on a component may be designed with an optimal location and a shape. For example, the location of a metrology feature may be selected to avoid interfering with robots used to contact the component to stabilize the component, or to re-orient or re-position the component based on a measurement result, for example. Thus, if a preferred positioning or shape of the metrology features is evident from the assembly cell configuration, it may be beneficial to incorporate this data into the design of the component.

The need for the engagement features (FIG. 4) is in competition with the design of the metrology features, especially for smaller components. As shown in FIG. 5, a measurement device 508 may be placed at a fixed portion of the assembly cell 500. However, one or more of the robots 502, 504, 506, 517, 555, 514, 523 and 540 may be configured to move. In addition, as shown in FIG. 5, two or more 3-D printed components shown in circular regions 518 and 555 are being joined. In an embodiment, the assembly process is a fixtureless process. In one portion of FIG. 5, a first assembly robot 502 may be gripping a first engagement feature, while gripper robot 506 may be engaging a second engagement feature, on the same part or on a different part being joined. As described, a plurality of metrology features may be included on 3-D printed component 518.

Measurement device 508 may be a laser detector. In an embodiment, the cell arrangement is organized such that the measurement device 508 may have a clear line of sight to the component at 518. Concurrent with the measurement process or in some predetermined sequence, assembly robots 502 and gripper robot 512 may be engaging with another 3-D printed component in region 555 and preparing it for assembly. In some embodiments, region 555 may show a pair of components being joined after metrology features are detected. In some embodiments, the robots may be performing different pre-processing techniques on the components, after which the component(s) in region 518 are joined with the component(s) in region 555. In other embodiments, two separate assembly processes are being conducted in parallel, each independent of the other.

Design work is generally performed well in advance of the assembly process in FIG. 5, to help ensure optimal results of the final assembled structure. Clearance requirements of the robots may be studied, and stiffness and other requirements of the external materials in the components may be designed to withstand assembly as well as subsequent use in a vehicle. In various embodiments, the components in 518 and 555 are subject to a generative design algorithm that starts on the outside and proceeds inward. This enables the outer surfaces of the components being joined to meet the extrinsic requirements of the structure that will ultimately be assembled from the constituent components.

In these cases, the manufacturer may work through the simulation of the robotic assembly at that earlier stage before the internal structure has been designed at all, to identify and define locations and orientations of the component. This outward-to-inward design process helps ensure that the components can function within the constraints of the assembly process.

After analyzing the external assembly of the components, the design down to the surface of the components may then be locked. Then the design optimization software can design the rest of the component from the outer surface inward. Because the inner portions of the components are often 3-D printed, this inward design process may provide greater overall design flexibility.

Figure 6:
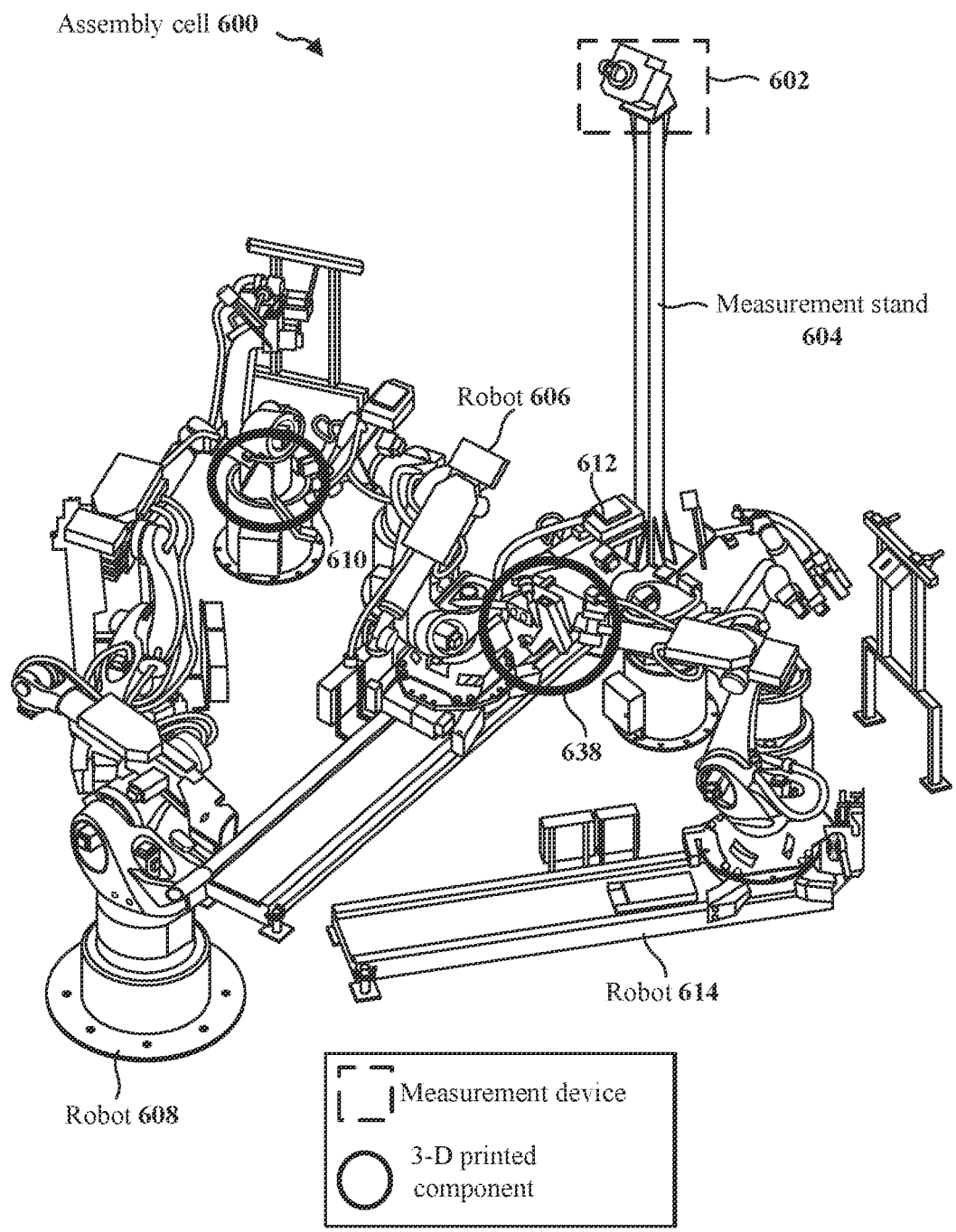
FIG. 6 is a perspective diagram illustrating an example of the assembly cell for joining parts using a measurement device that detects metrology features.

FIG. 6 is a perspective diagram illustrating an example of the assembly cell 600 for joining parts using a measurement device 602 that detects metrology features. The measurement device 602 may be a laser detector. In the view of FIG. 6, the measurement device 602 can be seen as elevated with an elongated structure 604. The structure 604 may in some embodiments include wiring to route detected location feature data to a central controller for further computation. The measurement device 602 may therefore be deemed to include the controller for making the computations during assembly. In this example, measurements may be made on metrology features present on the 3-D printed components located in regions 610 and 638. The components in regions 610 and 638 have distinctive looking shapes. The metrology features may be smaller in these cases, and the placement options more limited. The component in region 610 is shown as secured by robots 608 and 606. In addition, the component in region 638 is shown as being secured by robots 612 and 614.

Figure 7:
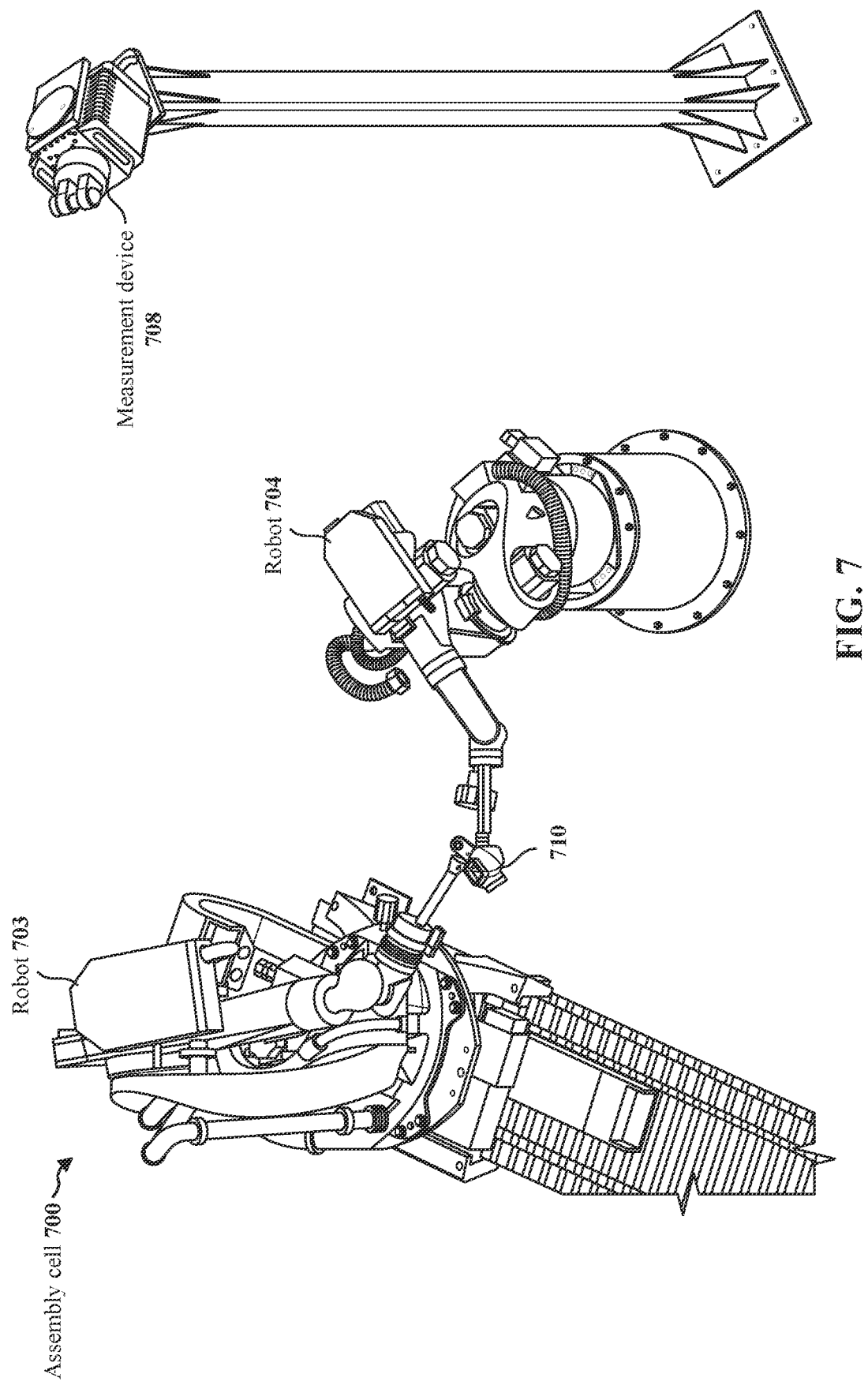
FIG. 7 is a perspective diagram of example portions of an assembly cell.
Figure 8:
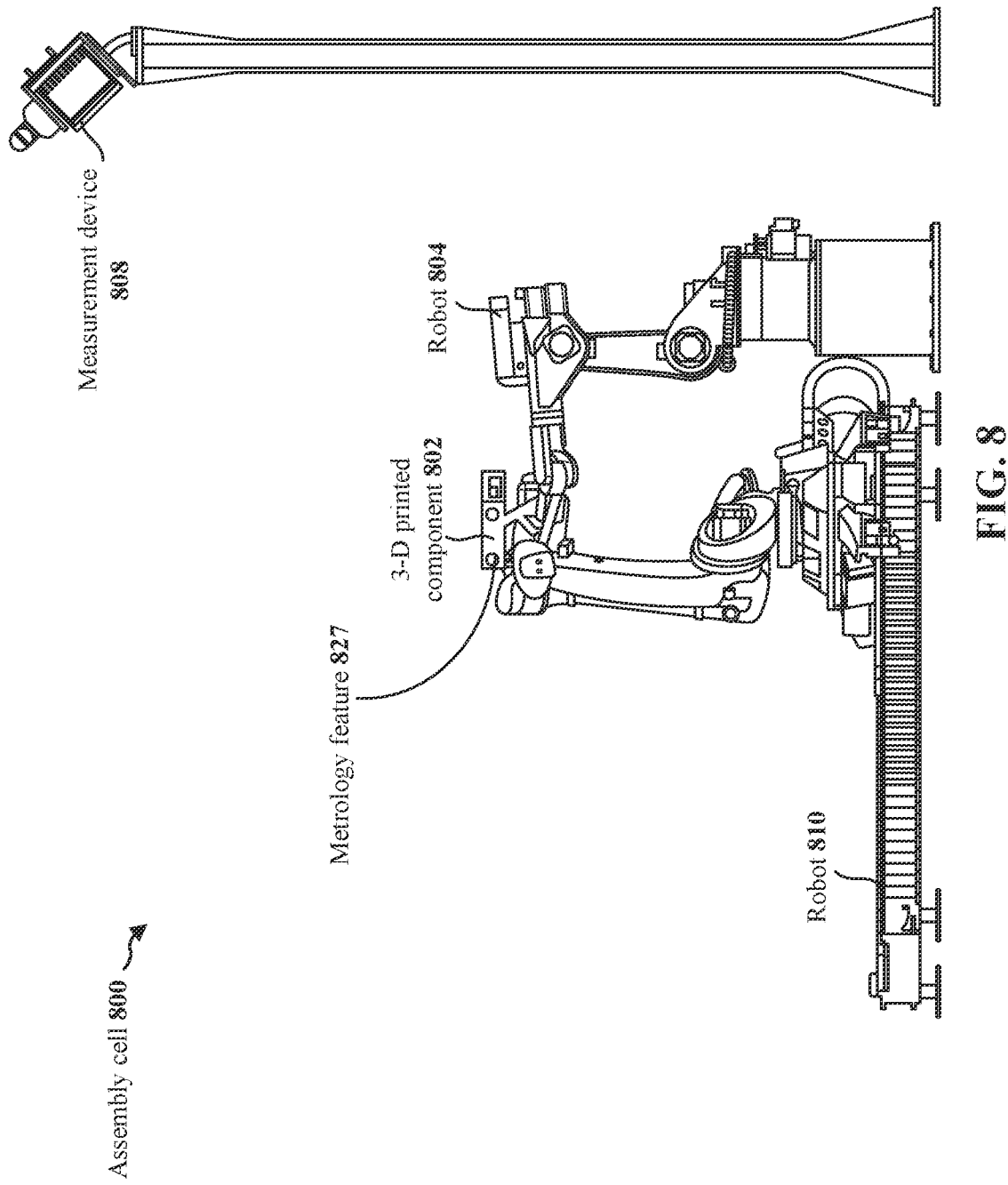
FIG. 8 is a side view of example portions of an assembly cell.

FIGS. 7-11 represent various exemplary views of similar assembly equipment performing metrology measurements on components. The equipment may also or instead be assembling components based on measurement results. FIG. 7 is a perspective diagram of example portions of an assembly cell 700 in which robots 703 and 704 are engaging a small component 710. The measurement device 708 may be positioned to scan the 3-D printed component 710 and to identify metrology features (not shown) with a clear field of view. In some embodiments, robots 703 and 704 may be configured to manipulate an orientation of the component such that the metrology features are within a direct line-of-sight of the measurement device 708. FIG. 8 is a side view of example portions of an assembly cell 800 in which robots 804 and 810 secure 3-D printed component 802. Small circular metrology features 827 can be seen on one side of the component 802, for detection by measurement device 808.

Figure 9:
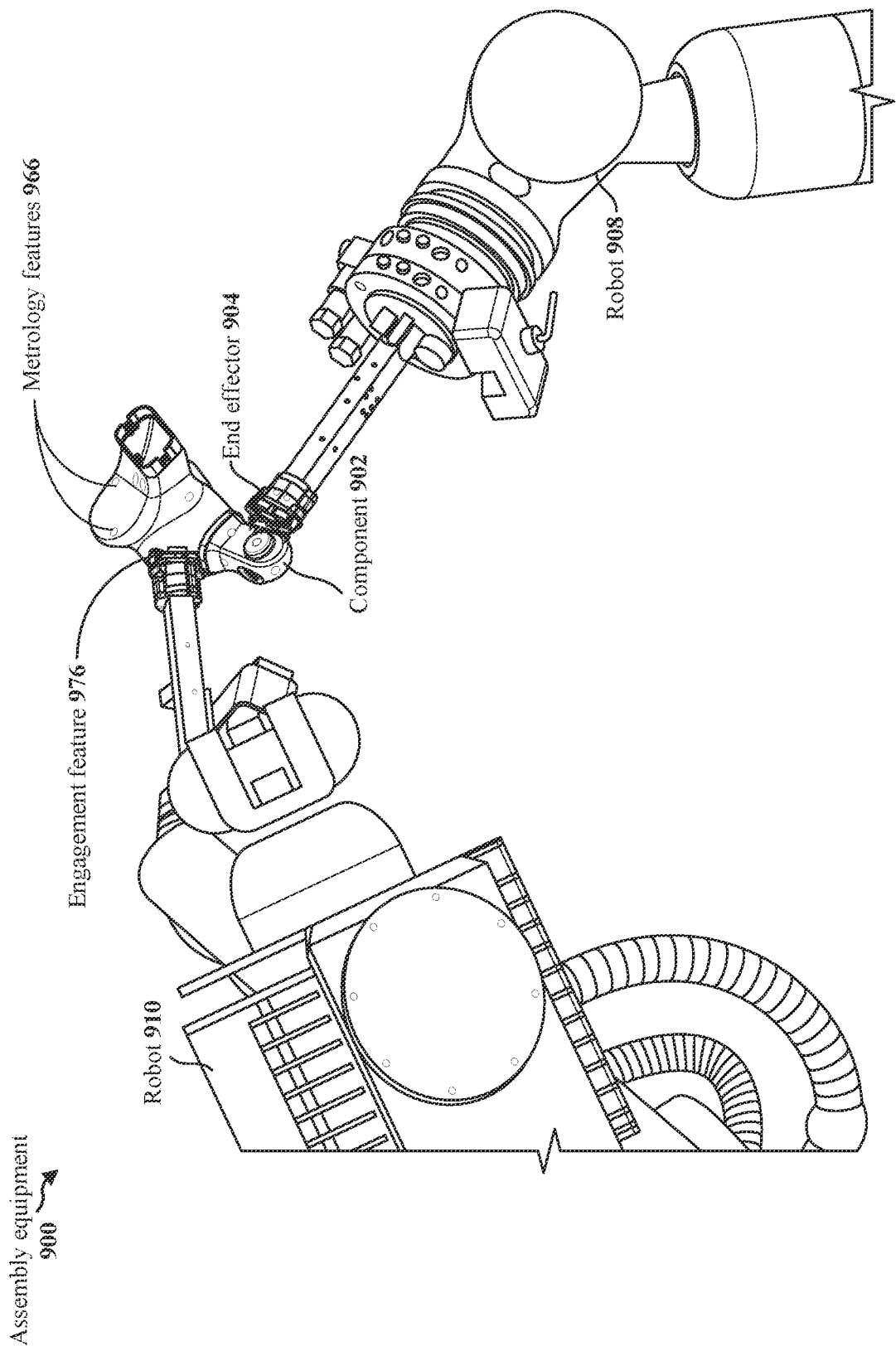
FIG. 9 is a perspective diagram of exemplary assembly equipment.

FIG. 9 is a perspective diagram of exemplary assembly equipment 900. Two robots 908 and 910 are shown securing or aligning different portions of component 902. Metrology features 966 are visible on an upper surface. Further, an engagement feature 976 may be used for robot 910 to engage the component 902. Robot 908 uses a different engagement feature, inserting a compatible end effector 904 to secure or mobilize component 902.

Figure 10:
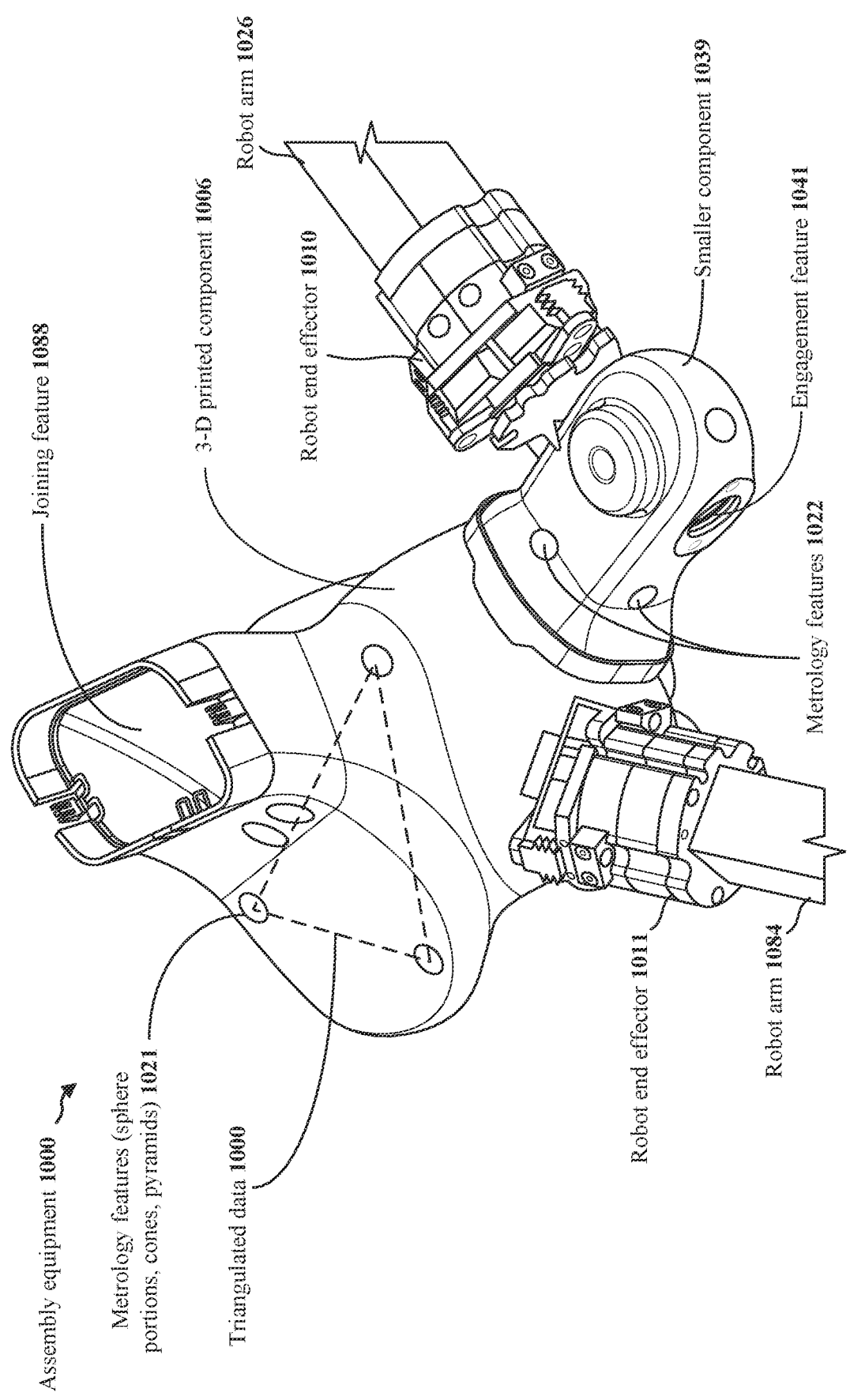
FIG. 10 is another perspective diagram of exemplary assembly equipment.

FIG. 10 is another perspective diagram of exemplary assembly equipment. Two robot arms 1084 and 1026 are shown engaging different portions of 3-D printed component 1006. Robot end effector 1011 may be coupled to an engagement feature (obscured from view) of the 3-D printed component 1006. Likewise, robot end effector 1010 is engaging the component 1006 from the other side. A vacant engagement feature 1041 is shown. The robots may be securing the component for measurement. They also may be orienting the component 1006 in preparation for joining the component with another part, or with more than one part. For example, in one embodiment, the two robot arms 1026 and 1084 may be preparing to join component 1006 with another part (not shown) using joining feature 1088 to connect to a compatible feature of the other part.

Metrology features 1021 can be seen on an upper portion of the component 1006. It will be appreciated based on previous discussion that the metrology features 1021 can use different shapes and geometric styles, including portions of a sphere, cones, different types of pyramids, and other custom features. An example of triangulated data lines 1000 is displayed to show how the metrology features 1021 may be used by a laser detector.

Additional metrology features 1022 are shown on the lower part of the component. These features may be used to increase precision of the measurements. In some embodiments, as in the anticipated assembly example involving the joining feature 1088, the robot arms may have previously used measurement results from the respective metrology features 1021 and 1022 to join the larger component 1006 with the smaller component 1039 in an initial assembly step. In some cases, the data from the combined set of available metrology features may thereafter be scanned, with the resulting detected data used to orient the existing component with yet another part (e.g., via joining feature 1088 as discussed).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A 3-D printed component comprising:
    a plurality of metrology features arranged at different feature locations on a surface of the component and configured to enable a measurement device to detect the feature locations and to determine at least a component position or a component orientation of the component based on the detected feature locations, wherein each of the metrology features is printed-in with the component; and
    an engagement feature configured to be engaged by a robot end effector of a robot, wherein the engagement feature is printed-in with the component.

2. The 3-D printed component of claim 1, wherein the plurality of metrology features comprises three metrology features, wherein the three metrology features are configured to enable the measurement device to triangulate the feature locations.

3. The 3-D printed component of claim 1, wherein the plurality of metrology features includes a first metrology feature, and a shape of the first metrology feature comprises a portion of a sphere.

4. The 3-D printed component of claim 3, wherein the portion of the sphere comprises a protruding spherical portion from the surface or a recessed spherical portion from the surface.

5. The 3-D printed component of claim 1, wherein at least one of the metrology features comprises at least a cone or a pyramid.

6. The 3-D printed component of claim 5, wherein the pyramid comprises a trihedral pyramid or a four-sided pyramid.

7. The 3-D printed component of claim 1, wherein the component comprises a node.

8. The 3-D printed component of claim 1, wherein each of the plurality of metrology features is located on the surface within a range of angles of incidence of an energy beam from the measurement device, the range of angles measurable relative to a coordinate axis normal to the surface and representing a maximum field of view of the measurement device.

9. The 3-D printed component of claim 1, wherein a shape and location of each of the plurality of metrology features is selected to allow the robot to concurrently or sequentially contact the component to stabilize, re-orient, or re-position the component.

10. The 3-D printed component of claim 9, wherein a measurement is taken during the stabilization, the reorientation or the repositioning of the component without having to disengage the robot from the component.

11. The 3-D printed component of claim 1, wherein the plurality of metrology features includes a first metrology feature, wherein a position of the first metrology feature is selected to allow more than one robot to concurrently, or selectively in sequence, access the component for performing one or more functions.

12. The 3-D printed component of claim 11, wherein the one or more functions include attaching or removing mechanical fixtures, aligning the component with another part, applying adhesive, using tools, sanding the component, or machining the component.

13. The 3-D printed component of claim 1, wherein the plurality of metrology features includes a first metrology feature having a minimum set-off distance from the engagement feature on the component such that gripping and measurement functions can are concurrently performed.

14. The 3-D printed component of claim 1, wherein at least one of the metrology features is configured to be removed after the component is assembled.

15. The 3-D printed component of claim 1, wherein the metrology features are configured to enable a contact-free measurement from the measurement device.

16. The 3-D printed component of claim 1, wherein the plurality of metrology features includes a first metrology feature, and the first metrology feature includes a generally planar portion of the surface of the component.

17. The 3-D printed component of claim 16, wherein the first metrology feature further includes at least a protruding portion that protrudes from the generally planar portion or a recessed portion that recedes from the generally planar portion.

18. The 3-D printed component of claim 17, wherein the generally planar portion surrounds at least the protruding portion or the recessed portion.

19. The 3-D printed component of claim 1, wherein the engagement feature is located based on the feature locations, such that the metrology features are not obscured from the measurement device during an assembly operation of the robot.

20. An apparatus comprising:
a measurement device for a 3-D printed component, the component including a plurality of printed-in metrology features arranged at different feature locations on a surface of the component, wherein the measurement device is configured to detect the feature locations of the printed-in metrology features and to determine at least a component position or a component orientation of the component based on the detected feature locations,
wherein the determined component position or the determined component orientation includes the measurement of a join frame corresponding to the component.

21. The apparatus of claim 20, wherein the measurement device is configured to detect a portion of a sphere protruding or receding from the surface and to determine that the detected portion of the sphere comprises one of the plurality of metrology features.

22. The apparatus of claim 21, wherein the measurement device is configured to define the feature location of a first metrology feature located at a center of the portion of the sphere.

23. The apparatus of claim 20, wherein the measurement device is configured to determine the component position or the component orientation by determining a least-squares minimization between the detected feature location for each of the metrology features and a corresponding nominal feature location.

24. The apparatus of claim 20, wherein:
the measurement device is configured to detect a plurality of cones, pyramids, or a combination thereof and to determine that the detected plurality of cones, pyramids, or combination thereof comprises the metrology features.

25. The apparatus of claim 24, wherein the measurement device is further configured to define the feature location of one of the determined metrology features to be an apex of the cone or pyramid.

26. The apparatus of claim 20, wherein the join frame includes a coordinate frame adjacent the component for joining the component with another structure.

27. The apparatus of claim 20, wherein the join frame is oriented along a vector of insertion for a joint in the component.

28. The apparatus of claim 27, wherein the joint includes a groove for use in a tongue-and-groove connection.

29. The apparatus of claim 20, wherein the measurement device includes a laser detector.

30. The apparatus of claim 20, wherein the measurement device is configured to triangulate the feature locations and to determine the at least a component position or the component orientation of the component based on the triangulation.

31. The apparatus of claim 20, wherein the apparatus comprises a robot;
wherein the robot is configured to position the component for joining with another part based on the determination by the measurement device of the at least the component position or the component orientation using the detected feature locations.

32. A 3-D printed component comprising:
a plurality of metrology features arranged at different feature locations on a surface of the component and configured to enable a measurement device to detect the feature locations and to determine at least a component position or a component orientation of the component based on the detected feature locations, wherein each of the metrology features is printed-in with the component, wherein the plurality of metrology features includes a first metrology feature having a minimum set-off distance from an engagement feature on the component such that gripping and measurement functions are concurrently performed.

* * * * *